Dec. 27, 1932.  F. C. HOLTZ  1,892,553
INDUCTION REACTION MOTOR
Filed Dec. 18, 1923
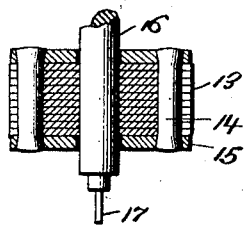
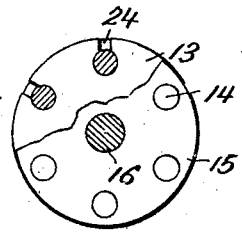
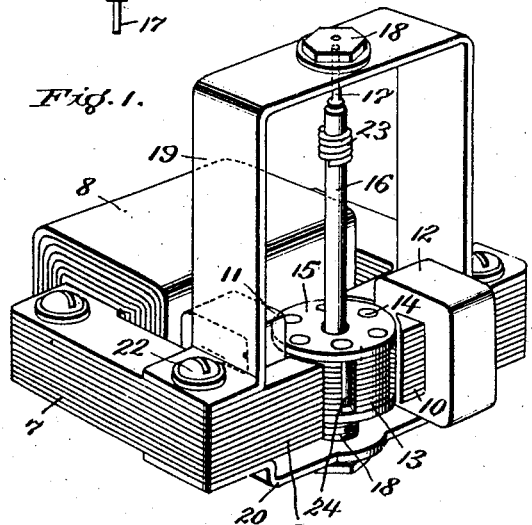
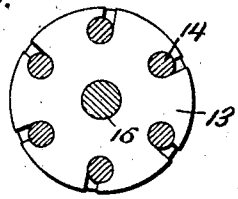
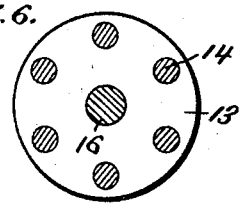
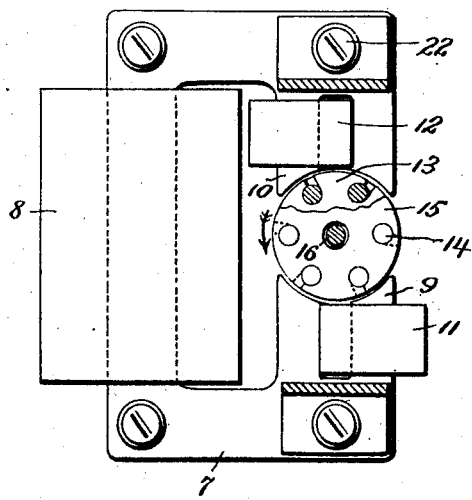
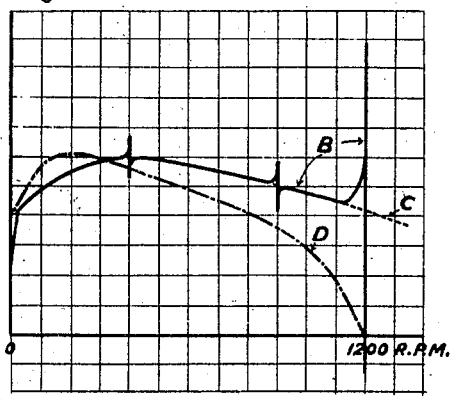
Inventor:
Frederick C. Holtz,
by Adams Jackson.
His Attorney Patented Dec. 27, 1932

1,892,553

UNITED STATES PATENT OFFICE

FREDERICK C. HOLTZ, OF SPRINGFIELD, ILLINOIS, ASSIGNOR TO SANGAMO ELECTRIC COMPANY, A CORPORATION OF ILLINOIS

INDUCTION REACTION MOTOR

Application filed December 18, 1923. Serial No. 681,361.

My invention relates to alternating current motors and in particular to motors of the induction reaction type.

In my copending application, Serial No. 504,623, filed October 1, 1921, entitled "Alternating current motors and methods of controlling the speed thereof" I have described and broadly claimed an induction reaction motor on which the present application is an improvement. In my prior application above referred to, I have described a motor of the reaction type provided with an induction motor secondary and so constructed and arranged that the motor will fall into synchronism at a speed which is a definite fraction of the full synchronous speed of an ordinary induction motor. By this arrangement, I provided a motor which started as an ordinary induction motor and ran as a reaction motor at a definite synchronous speed at which speed the induction motor action was productive of considerable torque, but insufficient torque to predominate over the reaction characteristics and carry the rotor above this speed. Owing to the presence of both induction motor and reaction motor torque at this speed, such a motor is able to carry considerable load at a definite synchronous speed. Moreover, the speed of such a motor may be made sufficiently low to enable the motor to be put to practical uses without resorting to excessive gear reduction.

In my prior application, the reaction characteristics were in most part obtained by means of a salient pole disc of magnetic material secured to one end of the squirrel cage rotor. The present application relates to a motor embodying the principle of operation of my previous motor, but in which the magnetic material of the squirrel cage rotor itself is proportioned to give just the required reaction characteristics whereby the extra salient pole disc of my previous motor may be dispensed with.

The features of my invention which I believe to be novel and patentable will be pointed out in the claims appended hereto. For a better understanding of my invention, reference is made in the following description to the accompanying drawing in which Fig. 1 shows a perspective view of a motor built in accordance with my invention; Fig. 2, an end view of such a motor except for a variation in the rotor to be explained hereinafter; Fig. 3 shows a cross section of the rotor of Fig. 1; Fig. 4 shows the arrangement of the laminations and the squirrel cage bars of the rotor of Fig. 1; Fig. 5 is a similar view of the rotor of Fig. 2 except that the end plate is not shown; Fig. 6 is a similar view of a rotor for a low frequency motor embodying my invention; and Fig. 7 a speed torque curve characteristic of my improved motor.

My improved motor may be designed for various synchronous speeds and is applicable to various uses, particularly where a small self-starting synchronous motor is desired, such as in the operation of timing devices. The particular motor which I have illustrated is designed to be used for operating the timing device of a demand meter register.

The stator of the motor is of a usual construction and comprises a single phase bipolar laminated field magnet 7 on which is mounted the coil 8 constituting the primary winding of the motor and which is to be connected to an alternating source of supply. 9 and 10 indicate the poles of the field magnet 7 the opposite faces of which are curved so that a cylindrical opening is provided between them in which the rotatably mounted secondary member or armature of the motor is located. The poles 9 and 10 are provided respectively with shading coils 11 and 12, mounted on the pole tips in the manner well known to those familiar with the art. These shading coils serve to change the pulsating flux of the field into a so-called shifting or substantially rotating magnetic field in the cylindrical space between the opposite poles of the field magnet.

The rotor comprises a magnetic core member made up of laminations 13 and a squirrel cage winding thereon consisting of bars 14 and plates 15 serving as end rings for the squirrel cage. It is not essential that the rotor be laminated or that the secondary induction element be in the form of a squirrel cage. The squirrel cage is preferably made of copper and the ends of the squirrel cage bars may be upset after the parts are assembled whereby the end plates securely hold the laminations together as represented in Fig. 3. This rotor is mounted on a suitable shaft 16 which is provided with pivot pins 17 which fit into suitable bearing plugs 18 secured in non-magnetic yokes 19 and 20 bridging the cylindrical air gap of the field member 7. The bearing plugs are preferably threaded through their respective yokes so as to be adjustable. The yokes are secured to the field member in any suitable manner such as by means of bolts 22. By this means the rotor is symmetrically rotatably mounted within the cylindrical space between the pole faces. The shaft 16 is provided with a worm thread 23 or equivalent arrangement for transmitting motion or power to the apparatus with which the motor is to be used.

The particular feature of novelty in my improved motor is embodied in the rotor of which three modifications are illustrated. In the modifications shown in Figs. 1 and 4 the laminations are provided in this case with six symmetrically spaced slots 24 and the six squirrel cage bars are symmetrically located in the bottoms of these slots. The slots are of sufficient width and depth that the rotor is given, what is in effect with this combination, six salient poles with pronounced reactance characteristics at a speed corresponding to a 6-pole synchronous motor. The slots 24 are so proportioned with respect to the pole faces of the stator that for different positions of the rotor, varying amounts of surface area are presented by this rotor to the field poles 9 and 10.

Such an arrangement of field structure and rotor without squirrel cage winding produces what in electrical terminology is known as a variable reactance. If, in such a combination, an alternating current voltage be applied to the terminals of the coil 8, it will be found that the current resulting from this supply voltage will not be the same for different positions of the rotor. If the rotor is slowly rotated on its axis, the current will vary between a given maximum and minimum value and the number of such changes per revolution will depend upon the number of slots or salient poles in the rotor. It is well known in the art that such an arrangement is capable of delivering a small amount of mechanical power when the rotating member is brought up to a speed such that this reactance pulsates at twice the line frequency of the alternating current supply. The amount of power that such a motor will deliver at this synchronous speed is greater if the stator has salient poles as distinguished from distributed poles, but it still is open to objection that it has only a low maximum torque at its synchronous speed, very low pull-in torque and no starting torque. To overcome these objectionable features, I provide the rotor of such a motor with the squirrel cage winding as illustrated. I am aware that it has heretofore been proposed to provide a reaction motor with a squirrel cage winding but in such combinations of the prior art, the synchronous speed of the reaction element of the motor was the same as the synchronous speed of the induction element of the motor so that while the reaction induction motor of the prior art was capable of self-starting, it still had very low pull-in torque and only that low synchronous torque due to the reaction characteristics alone. In my motor the synchronous speed of the reaction element of the motor is well below the synchronous speed of the induction element of the motor so that considerable induction motor torque is available at and near the synchronous speed of the reaction motor element. The induction motor torque at this speed is made slightly less than the reaction motor torque so that the rotor is brought up to this speed with good torque and is then capable of delivering power to an amount equal to the reaction motor torque plus the induction motor torque.

In Fig. 7, I have shown in full lines a speed torque curve B, typical of my improved motor. This curve is made up of the sum of two torques, namely, that due to the induction motor action and that due to the reaction motor action. The dotted line departures C from the full line curve represents the induction motor torque alone. From an inspection of this curve, it will be evident that there is ample starting torque, excellent pull-in torque and nearly twice as much running torque available as there would be without the addition of the induction motor torque at the synchronous speed of 1200 revolutions per minute. In the broken line D I have represented a typical induction motor torque curve for an induction motor, the theoretical synchronous speed of which is 1200 revolutions per minute, and if this curve D were added to the torque due to the reaction element of the motor alone, we would have a speed torque curve typical of the induction reaction motor of the prior art where the synchronous speeds of the induction motor element and the reaction motor element are made equal. At zero speed and at various intermediate points between zero and 1200 revolutions per minute, the speed torque curve B has slight departures from the induction motor torque curve C. These are due to slight reaction characteristics which such a motor has at such speeds. They are however insufficient to interfere with the desired performance of the motor. Due to the reduction in the starting torque caused by the reaction characteristics, it is important to select a design in which the reaction characteristics at standstill which tend to lock the rotor are materially less in effect than the induction motor starting action. Otherwise, the motor would have poor starting characteristics or would fail to start at all. It will be noted that the speed torque curve B also dips slightly below the zero torque line at 1200 revolutions per minute so that it will be evident that the induction motor action is not sufficient to pull the rotor above this speed against the reaction generator torque which comes into action as soon as any attempt is made to increase the speed above 1200 revolutions per minute. However, if some external force was provided to accelerate the rotor above this speed, it would continue to rise in speed due to the induction motor torque alone.

The best results are obtained by a fairly high resistance squirrel cage and this is accomplished in the present case by a relatively few number of squirrel cage bars. The high resistance squirrel cage increases the starting torque and since the squirrel cage never functions at speeds approaching its synchronous speed, there is no object in having it of a low resistance other than from the standpoint of efficiency. But since the present type of motor is intended for small sizes, the question of efficiency is of minor importance.

The rotor of Fig. 4 has the bars symmetrically arranged in the bottoms of the slots which gives good results. However, I have found that if the bars are slightly offset from the center of the slot towards the direction of rotation, as represented in Figs. 2 and 5, the synchronous torque of the motor is materially increased above that obtained by the rotor of Fig. 4. The reason for this is not fully understood at the present time, but my belief is that when the magnetic poles of the armature are allowed to lag slightly behind the armature conductor, as represented in Fig. 2, the armature conductors have flux paths which have a lower reluctance as compared to the reluctance when the slots come directly over the armature conductors. This has a tendency to somewhat increase the starting characteristics and produce a slightly higher speed from the standpoint of induction motor characteristics. There are a number of variables entering into the proper design of this new type of motor and one of the most important is the frequency of the source of supply. The proportions of the motor shown in Figs. 1 to 5 inclusive have been found satisfactory for 60 cycle, 110 volt operation which gives the synchronous speed of 1200 revolutions per minute and the general type of speed torque characteristics represented in Fig. 7. As the frequency of the source of supply is reduced, less iron should be cut away in the rotor to produce the correct proportions of induction motor and reaction motor characteristics. The proportions of the rotor shown in Fig. 6 have been found satisfactory for operation on a 25 cycle, 110 volt source of supply. In this figure, the laminations are provided with only the holes necessary to receive the squirrel cage bars and no slots are required to give the required reaction characteristics at this frequency. Such a rotor having a six-salient pole effect, formed by the rotor laminations, will run at 500 revolutions per minute on a 25 cycle source in the 2-pole stator illustrated.

In the foregoing, a motor having two salient stator poles and six rotor poles has been described. The invention is not limited in this respect however. The theory underlying the relation of pole numbers in the stator and the rotor of a reaction motor is somewhat involved and so far as applicant is aware, no attempt has been made by prior investigators to formulate any such theory. The following is believed to be a correct theory applicable to this subject.

Let $P_1$ represent the number of salient primary poles or teeth and $P_2$ the number of salient secondary poles or teeth. Also, let the number of magnetic poles in the primary winding be P, and let this winding be so arranged that it also produces an $m$th harmonic magnetomotive force of $mP$ poles. In the usual type of reaction motor $P = P_2$. In most such cases the stator has a distributed winding and a large number of small teeth and the values of $P_1$ and $m$ are unimportant and affect only the losses and general excellence of the motor. In the applicant's motor $P_2 > P$ and the primary preferably has $P_1$ salient poles and less in number than $P_2$. Also, the presence of an $m$th harmonic, where $m$ is determined by the values of $P$, $P_1$ and $P_2$ is essential to the functioning of the machine. If the value of $m$ is unity, the fundamental, or P pole magnetomotive force is the cause of the reaction effect, but in general, it is not equal to unity, but is equal to 3, 5, 7 and so forth. $m$ may also have negative values corresponding to harmonics of opposite direction of rotation to the fundamental. The relation of the quantities above defined in my improved motor must be such that $$P(m+1) = \pm 2(P_2 - P_1)$$

if the motor is to run synchronously at a speed corresponding to $P_2$ poles. The negative sign in this equation covers the case of a reaction torque acting when the direction of rotation is opposite to that of the induction motor torque. As the induction torque is relied upon for starting, this case is of no practical interest, consequently the equation may be written thus:

$$P(m+1) = 2(P_2 - P_1).$$

In the example hereinbefore given, to illustrate applicant's motor, $P = 2$, $P_2 = 6$, and $P_1 = 2$, so that $2(m+1) = 8$ or $m = 3$, or in other words, there must exist a third harmonic magnetomotive force in the primary.

Again, if $P=2$, $P_2=12$, and $P_1=4$, there is required a seventh harmonic in the stator magnetomotive force in order that the motor will run synchronously at a 12-pole speed. In a single phase motor there is no danger of not having the required harmonic present. There will also be other harmonics present which may account for the minor dips in the torque curve of Fig. 7. However, it is believed that if the above formula is followed in the design of the motor and the proper relation of induction motor torque and reaction motor torque exists, such a motor may be designed to run at any one of a number of synchronous speeds less than the full theoretical synchronous speed of the induction motor element.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other arrangements.

What I claim as new and desire to secure by Letters Patent of the United States, is:

1. A rotor for a reaction induction motor comprising a cylindrical body of magnetic material, a plurality of symmetrically arranged slots in said rotor, a squirrel cage winding on said rotor having the same number of bars as there are slots, said bars being located in the bottoms of said slots and symmetrically disposed to one side of the center lines of said slots.

2. An induction reaction motor comprising a shaded pole primary stator member and a squirrel cage secondary rotor member, said secondary member comprising a cylindrical core of magnetic material provided with a plurality of symmetrically disposed slots forming a reaction motor secondary of a greater number of poles than the primary member and having the bars of the squirrel cage located in the bottoms of said slots and slightly disposed to one side of said slots toward the direction of rotation.

3. An induction reaction motor comprising a primary stator member provided with means for producing a substantially rotating magnetic field and a secondary rotor member comprising a cylindrical core of magnetic material provided with a plurality of symmetrically disposed slots forming a reaction motor secondary of a greater number of poles than the primary member and an induction motor winding on said secondary having its conductors located in said slots and disposed to one side of said slots toward the direction of rotation of the primary magnetic field.

4. A single phase reaction induction motor having cooperating primary and secondary members, said primary member comprising a bi-polar shaded pole stator and said secondary member comprising a rotatable cylindrical core of magnetic material provided with a plurality of symmetrically disposed slots forming a reaction motor secondary of a greater number of poles than the primary member, a squirrel cage winding on said core having a bar in each of said slots disposed away from the center line of said slots toward the direction of rotation.

5. A single phase reaction induction motor having cooperating primary and secondary members, said primary member comprising a shaded pole bi-polar stator and said secondary comprising a laminated core squirrel cage induction rotor having six symmetrically disposed slots in which the squirrel cage bars are located, said slots forming salient poles in the rotor laminations of such prominence that said motor develops a reactionary torque at a six-pole speed in excess of the squirrel cage torque at such speed.

In witness whereof, I have hereunto set my hand this fourteenth day of December, 1923.

FREDERICK C. HOLTZ.